United States Patent
Chen

(10) Patent No.: US 10,551,938 B1
(45) Date of Patent: Feb. 4, 2020

(54) OPTICAL MEMBRANE SWITCH DEVICE

(71) Applicant: Chicony Electronics Co., Ltd., New Taipei (TW)

(72) Inventor: Chien-Tsung Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/191,261

(22) Filed: Nov. 14, 2018

(30) Foreign Application Priority Data

Jul. 25, 2018 (TW) .............................. 107125795 A

(51) Int. Cl.
| | |
|---|---|
| *G02B 5/20* | (2006.01) |
| *G06F 3/02* | (2006.01) |
| *G02B 6/35* | (2006.01) |
| *F21V 8/00* | (2006.01) |

(52) U.S. Cl.
CPC .............. *G06F 3/0202* (2013.01); *G02B 5/20* (2013.01); *G02B 6/0021* (2013.01); *G02B 6/354* (2013.01)

(58) Field of Classification Search
CPC ....... G06F 3/0202; G02B 5/20; G02B 6/0021; G02B 6/354
USPC ...................................... 200/310; 250/227.22
See application file for complete search history.

(56) References Cited

U.S. PATENT DOCUMENTS 4,480,182 A * 10/1984 Ely ...................... G02B 6/3522
    250/227.22
4,733,068 A * 3/1988 Thiele ..................... G01L 1/242
    250/227.14

\* cited by examiner

*Primary Examiner* — Edwin A. Leon
*Assistant Examiner* — Iman Malakooti
(74) *Attorney, Agent, or Firm* — Muncy, Geissler, Olds & Lowe, P.C.

(57) ABSTRACT

An optical membrane switch device includes a first membrane layer, a second membrane layer, and a spacer layer. The first membrane layer includes a first surface and light input lines. The light input lines are disposed on the first surface. Each light input line is slantingly extended with first branch lines. The second membrane layer includes a second surface and light output lines. The light output lines are disposed on the second surface. Each light output line is slantingly extended with second branch lines. The second branch lines respectively extend to the corresponding first branch lines to form contact regions. The spacer layer is clamped between the first membrane layer and the second membrane layer and includes through holes respectively corresponding to the contact regions. The first and second branch lines corresponding to the through holes at least partially overlap each other and keep a preset interval from each other.

12 Claims, 11 Drawing Sheets

OPTICAL MEMBRANE SWITCH DEVICE

CROSS-REFERENCE TO RELATED APPLICATION

This non-provisional application claims priority under 35 U.S.C. § 119(a) to Patent Application No. 107125795 filed in Taiwan, R.O.C. on Jul. 25, 2018, the entire contents of which are hereby incorporated by reference.

BACKGROUND

Technical Field

The instant disclosure relates to a switch device and, more particularly, to an optical membrane switch device.

Related Art

Keyboards are very common input devices, which are usually used along with electronic devices such as desktop computers, laptop computers, smart phones, or tablet computers. The development of electronic devices trends towards a light, compact design. Correspondingly, most of keyboards adopt membrane switches, which are small, thin, and light.

In general, a membrane switch is mainly consisted of three overlapped membrane layers. Opposite surfaces of upper and lower membranes are printed with conductive lines and conductive contacts. The conductive contacts correspond to positions of keys. A middle layer is an insulation layer, which prevents the upper and lower layers from directly contacting each other and being shorted. While a user presses a key of the keyboard, the membrane of upper layer is pressed, such that the corresponding conductive contacts of the upper and lower membranes contact each other. As a result, the conductive lines of the upper and lower membranes can be conducted to generate a signal corresponding to the pressed key.

Nonetheless, the conductive contacts are easy to abrade and oxidize and are easily affected by dust, such that the sensitivity of the keys degrades. In addition, conventional keys are not water-proofed; therefore, the typing quality of keyboards is significantly lower. On the other hand, a pressing signal may be detected from a key which is not pressed while multiple keys are simultaneously pressed due to a reverse feedback of circuit, or a correct signal of combined keys may be not determined while multiple keys are simultaneously pressed. As a result, the issue of ghost key may occur.

SUMMARY

To address the above issue, an embodiment provides an optical membrane switch device comprising a first membrane layer, a second membrane layer, and a spacer layer. The first membrane layer comprises a first surface and a plurality of light input lines. The light input lines are disposed on the first surface. Each of the light input lines comprises a light input end. Each of the light input lines is slantingly extended with a plurality of first branch lines. The second membrane layer comprises a second surface and a plurality of light output lines. The light output lines are disposed on the second surface. The second surface and the first surface are opposite to each other. Each of the light output lines comprises a light sensing end. Each of the light output lines is slantingly extended with a plurality of second branch lines. The second branch lines respectively extend to the corresponding first branch lines to form a plurality of contact regions. The spacer layer is clamped between the first surface of the first membrane layer and the second surface of the second membrane layer. The spacer layer comprises a plurality of through holes respectively corresponding to the contact regions. Each of the first branch lines and each of the second branch lines corresponding to each of the through holes at least partially overlap each other and keep a preset interval from each other, wherein each of the contact regions is optionally pressed to have each of the corresponding first branch lines contact each of the corresponding second branch lines via each of the corresponding through holes to guide light, such that light rays inputted from each of the light input ends are capable of being transmitted to each of the light sensing ends via each of the light input lines, each of the first branch lines, each of the second branch lines, and each of the light output lines.

Concisely, according to embodiments of the optical membrane switch device of the instant disclosure, while each of the contact regions is pressed, each of the corresponding first branch lines contacts each of the corresponding second branch lines to guide light, such that light rays inputted from the light input ends are capable of being transmitted to each of the light sensing ends to generate corresponding signals based upon the state of light guide. Comparing to conventional membrane switch of electrically contacting type, the embodiments of the instant disclosure need no electric circuits and can be water-proofed. The issues of abrading and oxidizing of the conductive contacts which cause the degrading of the sensitivity of the keys can be avoided. In addition, by the first branch lines and the second branch lines corresponding to each of the through holes at least partially overlapping each other, it is ensured that the first branch lines and the second branch lines corresponding to each other can contact each other while each of the contact regions is pressed. Further, the strength of press of the pressed contact region can be determined based upon a contacting area of the corresponding first branch line and the corresponding second branch line.

DETAILED DESCRIPTION

Figure 1:
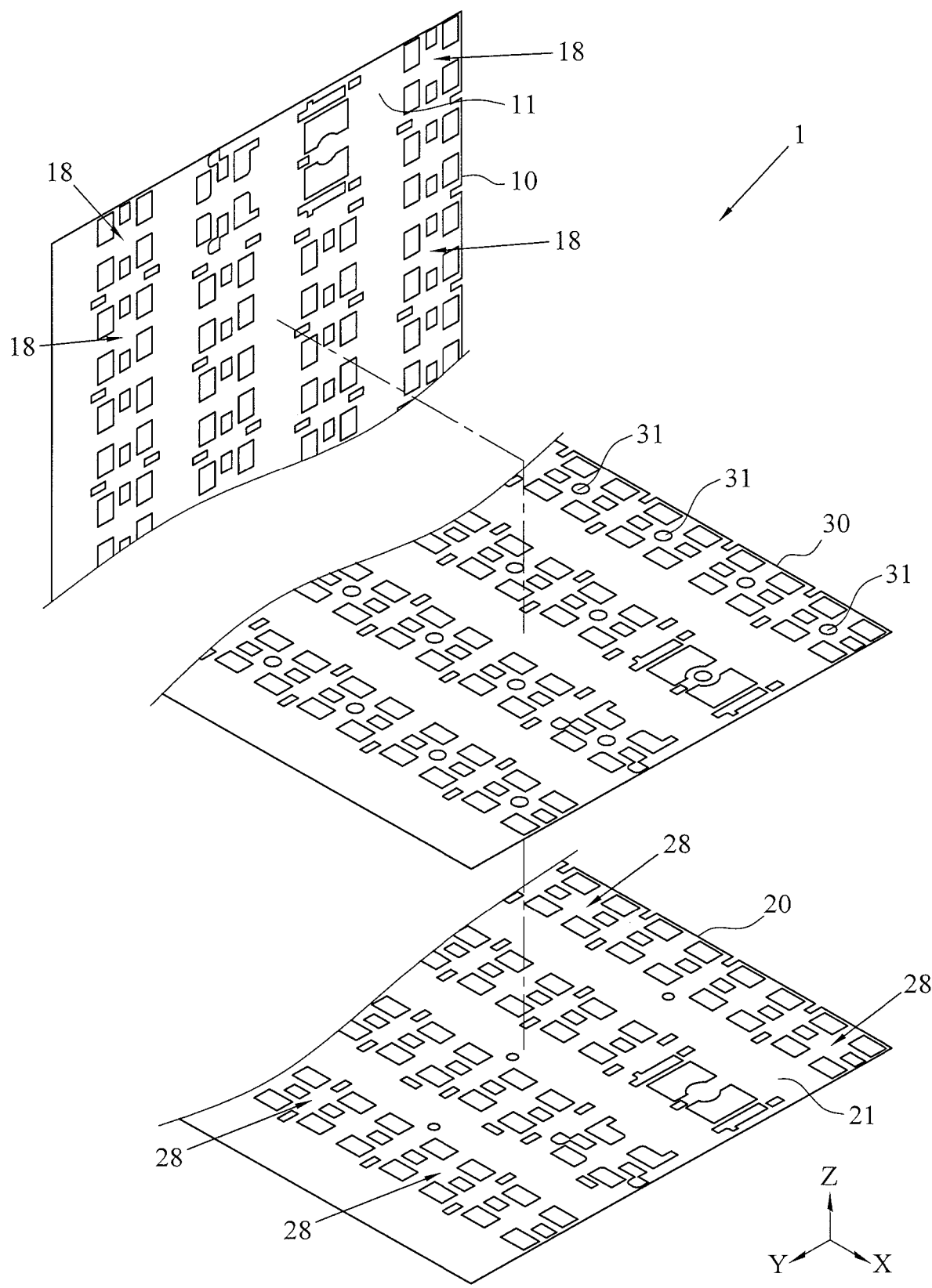
FIG. 1 illustrates an exploded view of an optical membrane switch device according to an embodiment of the instant disclosure.
Figure 2:
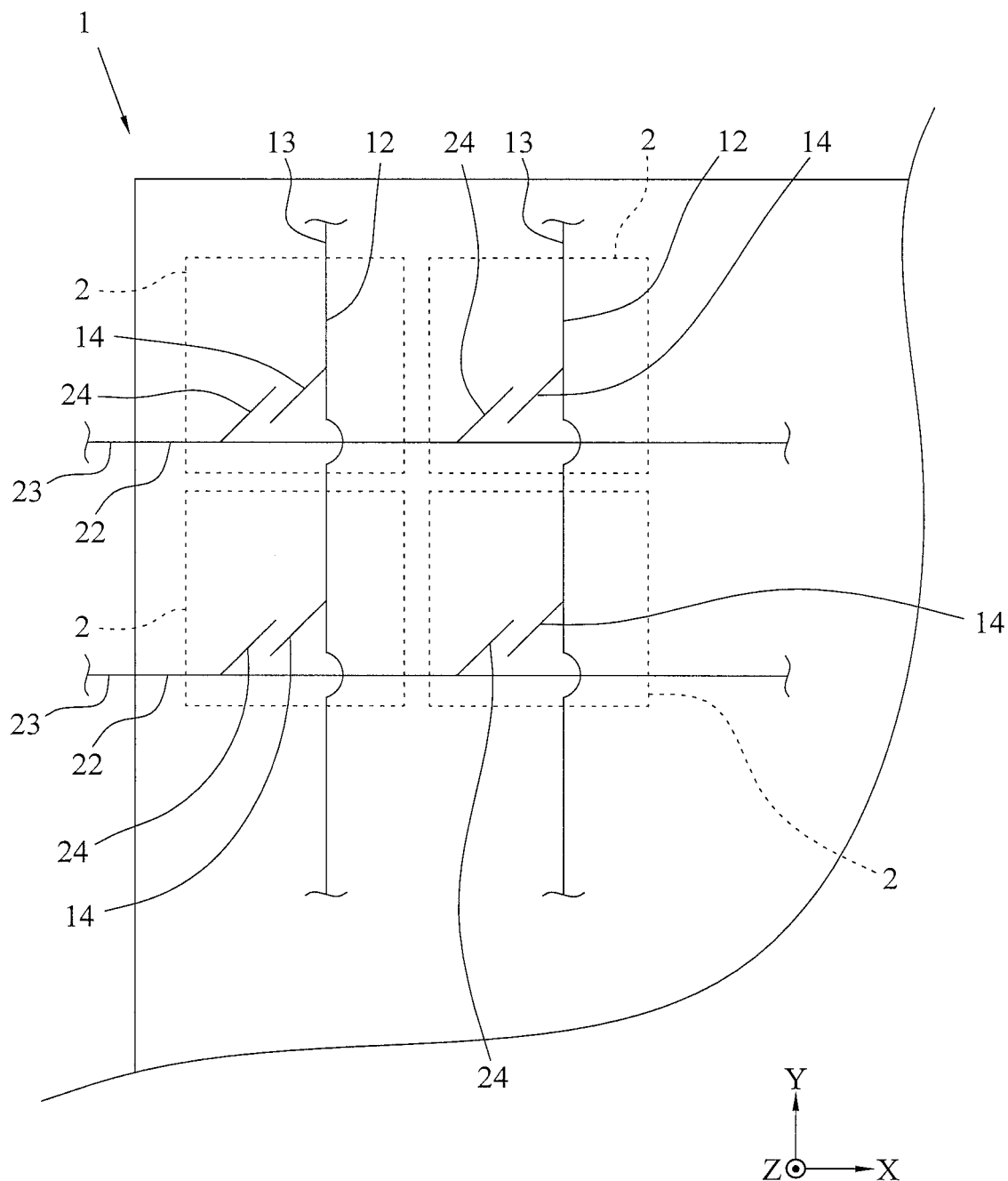
FIG. 2 illustrates a partially schematic diagram of lines of the optical membrane switch device according to an embodiment of the instant disclosure.
Figure 3:
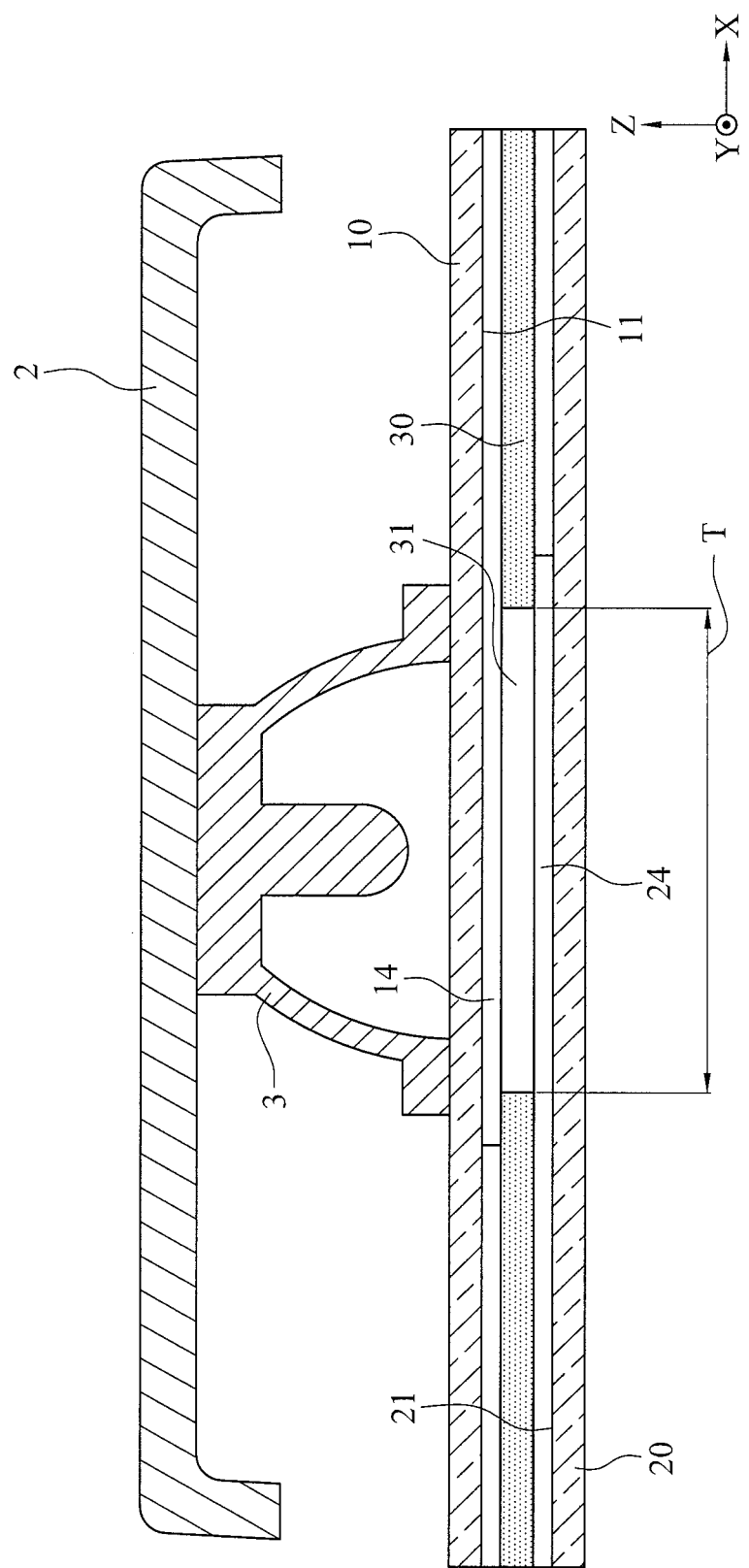
FIG. 3 illustrates a partially cross sectional view of the optical membrane switch device according to an embodiment of the instant disclosure.

FIG. 1 is an exploded view of an optical membrane switch device according to an embodiment of the instant disclosure. FIG. 2 is a partially schematic diagram of lines of the optical membrane switch device according to an embodiment of the instant disclosure. FIG. 3 illustrates a partially cross sectional view of the optical membrane switch device according to an embodiment of the instant disclosure.

As shown in FIG. 1 to FIG. 3, an optical membrane switch device 1 is a multi-layer membrane structure, comprising a first membrane layer 10, a second membrane layer 20, and a spacer layer 30. In the embodiment, the optical membrane switch device 1 as a whole can be rectangular, square, circular, or irregular depending on the shape of an actual product. For example, in the embodiment, the optical membrane switch device 1 is applied to a computer keyboard and thus is, but not limited to, rectangular depending on the shape of the computer keyboard.

As shown in FIG. 1, in the embodiment, the first membrane layer 10 is on the top layer. The second membrane layer 20 is on the bottom layer. The spacer layer 30 is clamped between the first membrane layer 10 and the second membrane layer 20. For example, the spacer layer 30 is adhered between the first membrane layer 10 and the second membrane layer 20 by adhesive. Nonetheless, in some embodiments, the configuration of up and down of the first membrane layer 10 and the second membrane layer 20 of the optical membrane switch device 1 can be altered depending on the needs in practice. In a case of the optical membrane switch device 1 applied to a keyboard, the first membrane layer 10 may be close to keys of the keyboard, and the second membrane layer 20 may be relatively close to a base plate of the keyboard. Alternatively, the first membrane layer 10 may be close to the base plate of the keyboard, and the second membrane layer 20 may be relatively close to the keys of the keyboard. It is not limited to the above embodiments.

Please refer to FIG. 1 and FIG. 2. The first membrane layer 10 comprises a first surface 11 and a plurality of light input lines 12. In the embodiment, the first surface 11 is a lower surface of the first membrane layer 10 (if the first membrane layer 10 is the bottom layer, the first surface 11 is an upper surface of the first membrane layer 10). The light input lines 12 are disposed on the first surface 11. For example, the light input lines 12 are made by light guide material (e.g., inorganic polymer light guide material, organic polymer light guide material, or organic-inorganic mixed light guide material), which is disposed on the first surface 11 in a manner such as printing or etching process to form multiple light guide lines. In some embodiments, a body of the first membrane layer 10 may be membrane made by plastic material such as polyimide, polyethylene terephthalate, or polycarbonate. In some embodiments, a refractive index of each of the light input lines 12 may be between 1.6 and 4. For example, each of the light input lines 12 may be made by a light guide material of high refractive index such as nano titanium dioxide ink, titanium dioxide, or silicon.

As shown in FIG. 1 and FIG. 2, the second membrane layer 20 comprises a second surface 21 and a plurality of light output lines 22. The second surface 21 and the first surface 11 are opposite to each other. In the embodiment, the second surface 21 is an upper surface of the second membrane layer 20 (if the second membrane layer 20 is the top layer, the second surface 21 is a lower surface of the second membrane layer 20). The light output lines 22 are disposed on the second surface 21. For example, the light output lines 22 are made by light guide material (e.g., inorganic polymer light guide material, organic polymer light guide material, or organic-inorganic mixed light guide material), which is disposed on the second surface 21 in a manner such as printing or etching process to form multiple light guide lines. In some embodiments, a body of the second membrane layer 20 may be membrane made by plastic material such as polyimide, polyethylene terephthalate, or polycarbonate. In some embodiments, a refractive index of each of the light output lines 22 may be between 1.6 and 4. For example, each of the light output lines 22 may be made by a light guide material of high refractive index such as nano titanium dioxide ink, titanium dioxide, or silicon.

According to Snell's law, in a case of a route of light rays being from higher refractive index material (optically denser medium) towards lower refractive index material (optically thinner medium), if an incidence angle is greater than a critical angle, light rays do not enter the medium of lower refractive index but are continuously reflected inside the medium of higher refractive index (i.e., total internal reflection, TIR). According to the embodiment of the instant disclosure, each of the light input lines 12 and each of the light output lines 22 may be made by a material of higher refractive index which is disposed on the first membrane layer 10 and the second membrane layer 20 in a printing manner. That is, the refractive indices of each of the light input lines 12 and each of the light output lines 22 are greater than those of the first membrane layer 10, the second membrane layer 20, the spacer layer 30, and other media such as ambient air. Therefore, while light rays are transmitted in the light input lines 12 or the light output lines 22, the light rays can perform total internal reflections in light input lines 12 or the light output lines 22 and do not leak out. As a result, loss of light rays can be avoided and accuracy of signal detection can be increased.

As shown in FIG. 2, the embodiment is regarding a partially schematic diagram of lines of the optical membrane switch device 1. The light input lines 12 and the light output lines 22 are interlaced with each other. For example, as shown in FIG. 1, the light input lines 12 may be respectively disposed on the first surface 11 along X direction (not shown in the figure). The light output lines 22 may be respectively disposed on the second surface 21 along Y direction (not shown in the figure). Therefore, the light input lines 12 and the light output lines 22 are, but not limited to, interlaced with each other in perpendicular configuration.

Figure 4:
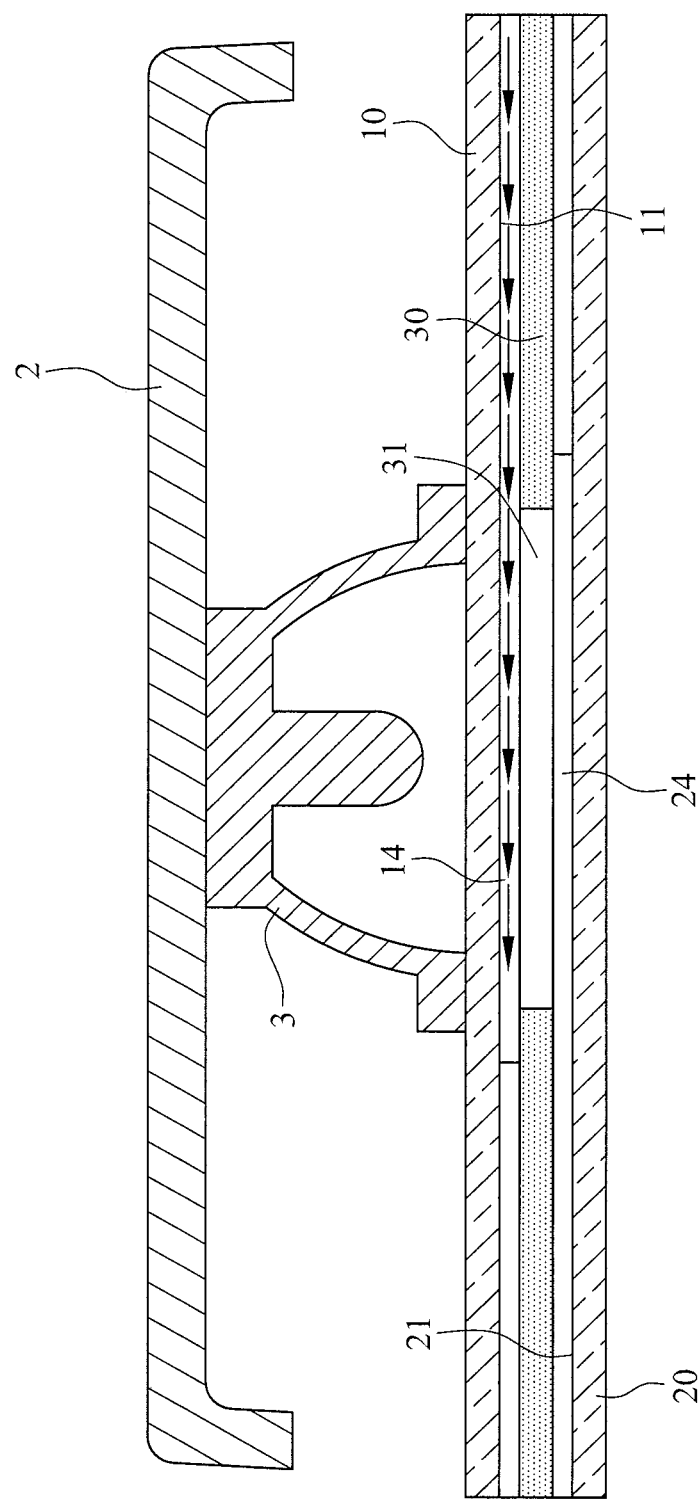
FIG. 4 illustrates a schematic diagram of light guiding of the optical membrane switch device according to an embodiment of the instant disclosure.
Figure 5:
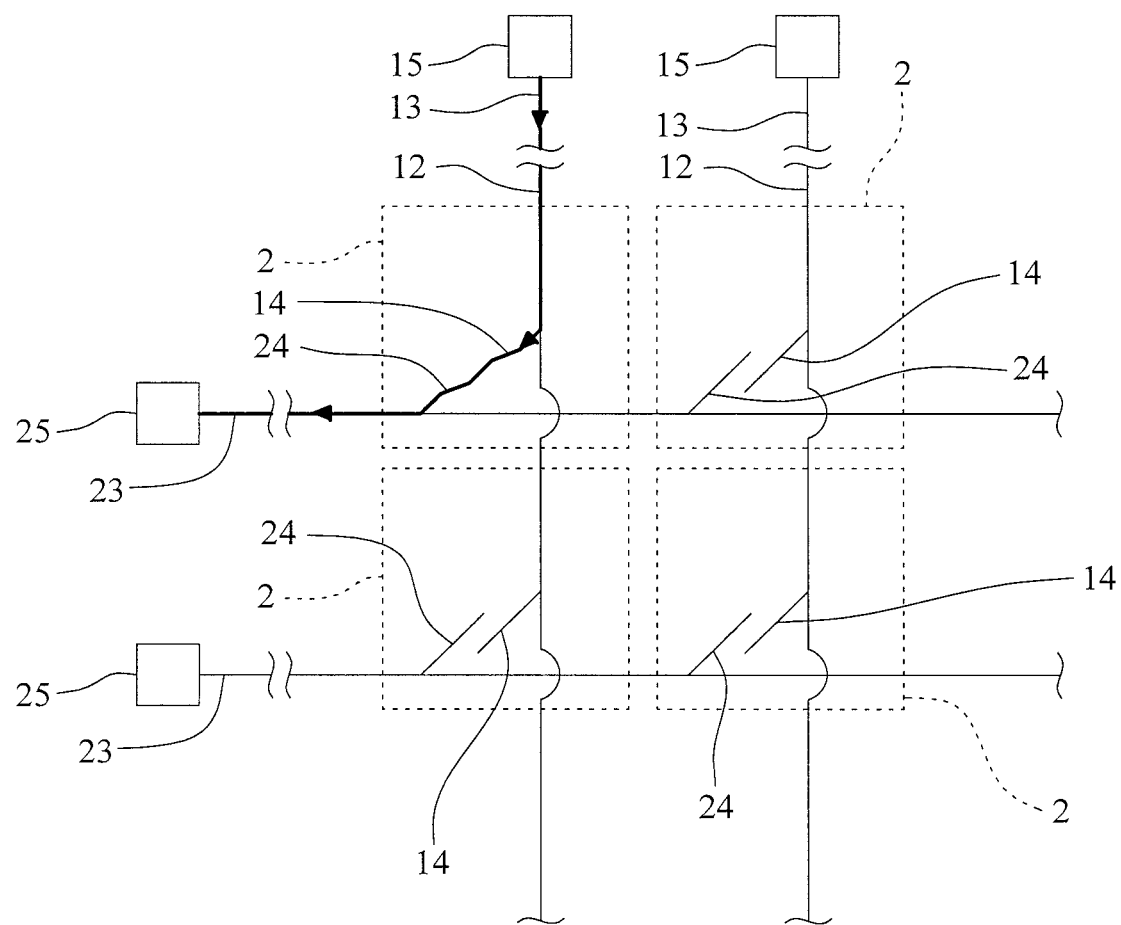
FIG. 5 illustrates a schematic diagram of line conducting of the optical membrane switch device according to an embodiment of the instant disclosure.

As shown in FIG. 1 to FIG. 3, the first membrane layer 10 may comprise a plurality of first key corresponded regions 18. The first key corresponded regions 18 are regions of the first membrane layer 10 corresponding to multiple keys 2. Each of the light input lines 12 comprises a light input end 13. Each of the light input lines 12 is further slantingly extended with a plurality of first branch lines 14 extending to each of the first key corresponded regions 18. Please refer to FIG. 2 and FIG. 4. Since the light input lines 12 and the first branch lines 14 are made of light guide materials, light rays inputted from each of the light input ends 13 are capable of being guided to the first branch lines 14 via each of the light input lines 12 (as shown in FIG. 4). In an embodiment, as shown in FIG. 5, each of the light input ends 13 of each of the light input lines 12 may be respectively connected with a light source 15 (e.g., an LED light, a fluorescent light, or an infrared light). The light source 15 may emit light rays transmitted from the light input end 13 to the light input line 12. However, it is not limited to the above embodiment. Each of the light input ends 13 of each of the light input lines 12 may also be connected to a same light source 15.

As shown in FIG. 1 to FIG. 3, the second membrane layer 20 may comprise a plurality of second key corresponded regions 28 corresponding to the first key corresponded regions 18 of the first membrane layer 10. Each of the light output lines 22 comprises a light sensing end 23. Each of the light output lines 22 is further slantingly extended with a plurality of second branch lines 24. The second branch lines 24 respectively extend to lower sides of the corresponding first branch lines 14 of the first membrane layer 10 to form a plurality of contact regions T. As shown in FIG. 3, the contact regions T are regions of each of the first branch lines 14 and each of the second branch lines 24 corresponding to trigger members 3 of the keys 2. In the embodiment, the trigger member 3 is an elastic body (e.g., a rubber dome). The trigger member 3 may also be a metal dome or a mechanical switch. It is not limited to the above embodiments.

As shown in FIG. 1 and FIG. 3, the spacer layer 30 comprises a plurality of through holes 31 respectively corresponding to the contact regions T. Each of the first branch lines 14 and each of the second branch lines 24 corresponding to each of the through holes 31 at least partially overlap each other and keep a preset interval from each other. In the embodiment, each of the first branch lines 14 and each of the second branch lines 24 corresponding to each of the through holes 31 completely overlap each other. It is not limited to the above embodiment. Since the light output lines 22 and the second branch lines 24 are also made of light guide materials, while one of the contact region T is pressed, the corresponding first branch line 14 contacts the corresponding second branch line 24 via the corresponding through hole 31 to guide light rays, such that light rays inputted from the light input end 13 are capable of being transmitted to the light sensing end 23 via the light input line 12, the first branch line 14, the second branch line 24, and the light output line 22 to further generate corresponding key signals based upon the state of light guide. It is illustrated with figures as follows.

Figure 6:
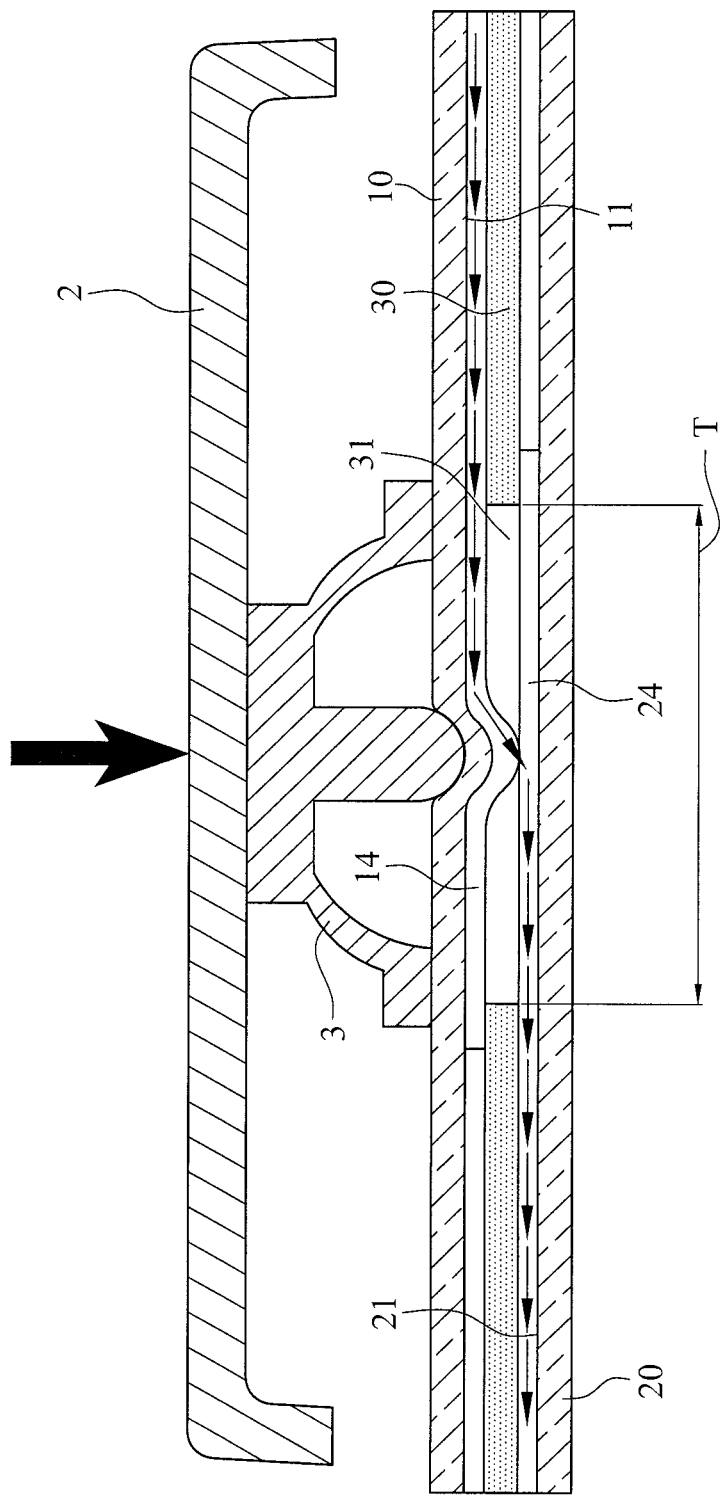
FIG. 6 illustrates a schematic diagram of triggering of the optical membrane switch device according to an embodiment of the instant disclosure.

Please refer to FIG. 3 to FIG. 5. In the embodiment, the light input ends 13 of the light input lines 12 are on the same side of the optical membrane switch device 1, and the light sensing ends 23 of the light output lines 22 are on the same side of the optical membrane switch device 1 and are respectively connected to a light sensor 25. The light sources 15 emit light rays sequentially to have the light rays transmitted from the light input ends 13 to the light input lines 12 and guided to each of the first branch lines 14 (as shown in FIG. 4). Please refer to FIG. 5 and FIG. 6. While one of the keys 2 is pressed (e.g., the key 2 in upper left corner in FIG. 5), the trigger member 3 is downwardly against the corresponding contact region T to have the first branch line 14 be close to and contact the second branch line 24 via the through hole 31 (as shown in FIG. 6), so as to have light rays in the first branch line 14 is capable of being transmitted to the second branch line 24 and being transmitted to the light sensing end 23 via the light output line 22. The light sensor 25 can therefore receive light rays and correspondingly output a light sensing signal. Consequently, which one of the keys 2 being pressed can be determined based upon the light sensing signal, and a functional signal of the pressed key 2 can be correspondingly generated.

Figure 7:
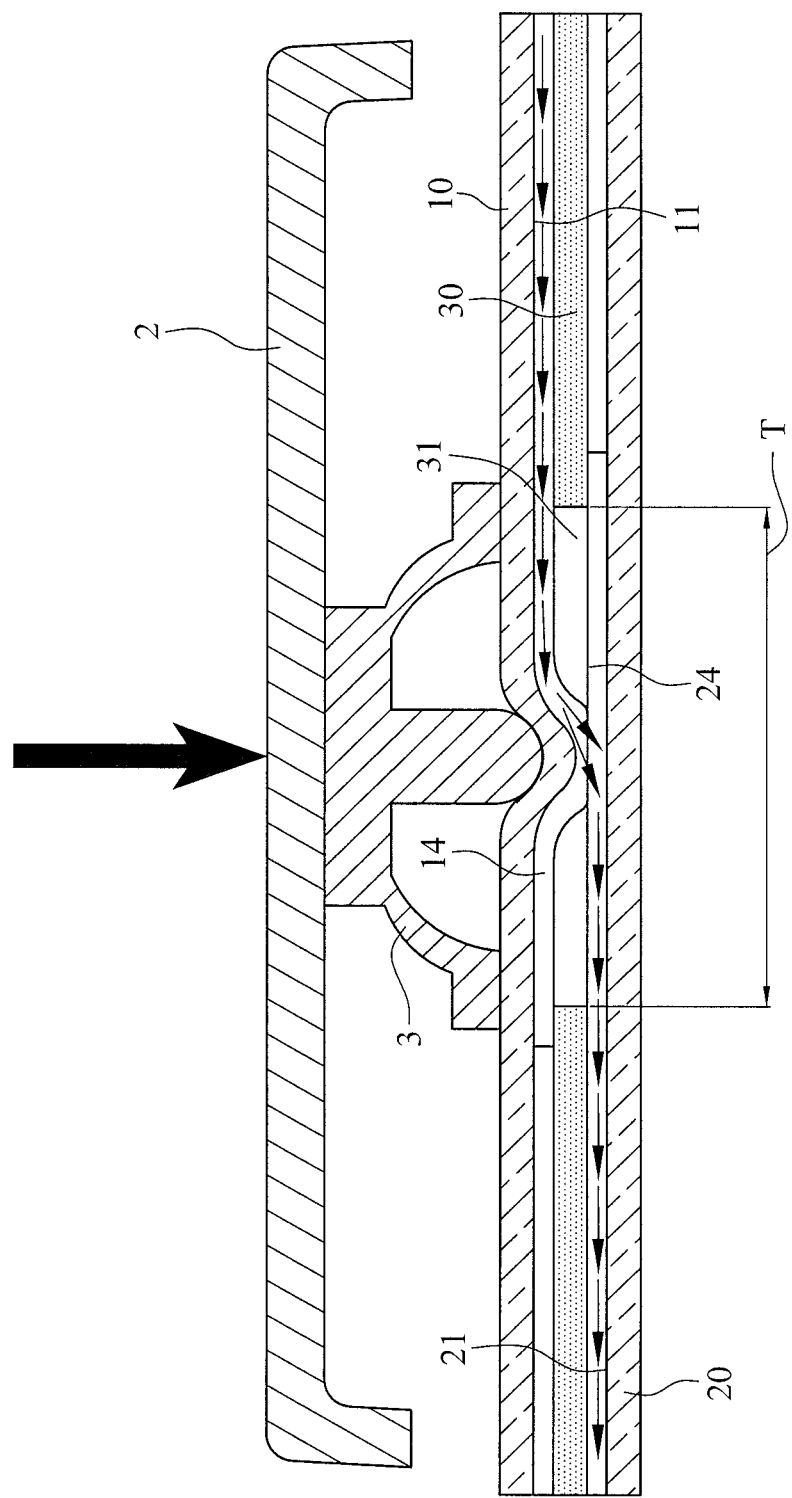
FIG. 7 illustrates a schematic diagram of triggering of the optical membrane switch device according to another embodiment of the instant disclosure.

Whereby the optical membrane switch device 1 of the embodiment generates signals of the keys 2 in an optical conduction manner. Comparing to conventional membrane switch of electrically contacting type, the embodiments of the instant disclosure need no electric circuits, such that a water-proof function can be reached. The issues of abrading and oxidizing of conductive contacts which causes the degrading of the sensitivity of the keys can be avoided. In addition, by the first branch lines 14 and the second branch lines 24 corresponding to the through holes 31 at least partially overlapping each other, it is ensured that the corresponding first branch lines 14 and the corresponding second branch lines 24 can contact each other to guide light while each of the contact regions T is pressed. Thus the efficiency of the light guiding is good. Issues of light leaking or dislocation can be avoided. In addition, the strength of press of each of the pressed contact regions T can be determined based upon a contacting area of the first branch lines 14 and the second branch lines 24. Please refer to FIG. 6 and FIG. 7. The greater the strength of press applied on the contact regions T, the bigger the contacting area of the first branch lines 14 and the second branch lines 24 is. For example, the strength of press applied on the contact region T of FIG. 7 is greater than that applied on the contact region T of FIG. 6; therefore, the contacting area of the first branch line 14 and the second branch line 24 of FIG. 7 is greater than that of the first branch line 14 and the second branch line 24 of FIG. 6, and the area for light guiding is increased. Further, a signal strength value of the light sensing signal outputted by the light sensor 25 is increased. In other words, the light sensing signal is in direct ratio to the contacting area of the corresponding first branch line 14 and the corresponding second branch line 24; therefore, the strength of press of the contact region T can be determined based upon the signal strength value of the light sensing signal, and can be used as a reference information of other applications.

As shown in FIG. 6 and FIG. 7, in an embodiment, a refractive index of each of the second branch lines 24 of the light output lines 22 is greater than or equal to that of each of the first branch lines 14 of light input lines 12. In other words, according to the characteristic of light rays being easily transmitted from medium of lower refractive index to medium of higher refractive index, while each of the contact regions T is pressed to have the corresponding first branch lines 14 contact the corresponding second branch lines 24 via each of the through holes 31, light rays are easier transmitted from the first branch lines 14 to the second branch lines 24 due to the refractive index of each of the second branch lines 24 being greater than or equal to that of each of the first branch lines 14. Consequently, the efficiency of light guiding and the accuracy of signal detecting can be improved.

As shown in FIG. 6 and FIG. 7, in an embodiment, each of the light input lines 12 of the first membrane layer 10 and each of the light output lines 22 of the second membrane layer 20 can be a single layer structure. In the embodiment, the refractive index of each of the light output lines 22 is greater than that of the second membrane layer 20 and the spacer layer 30. The situation that light rays are guided to the first membrane layer 10, the second membrane layer 20, and the spacer layer 30 while being transmitted in each of the light input lines 12 and each of the light output lines 22 can be prevented. Energy loss of light which impacts the accuracy of signal detection can be avoided.

Please refer to FIG. 2. In the embodiment, each of the light input lines 12 is extended with the first branch lines 14 on the same side. In addition, each of the light input lines 12 is slantingly extended with the first branch lines 14 along a direction away from each of the light input ends 13 and close to each of the light sensing ends 23. Each of the light output lines 22 is also extended with the second branch lines 24 on the same side. In addition, each of the light output lines 22 is slantingly extended with the second branch lines 24 along a direction away from each of the light sensing ends 23 and close to each of the light input ends 13. By the configuration of lines of the embodiments, the optical membrane switch device 1 can prevent an issue of ghost key. The ghost key means that a pressing signal is detected from one of the keys 2 not pressed, or a correct signal cannot be determined while multiple keys 2 are simultaneously pressed. It is illustrated with figures as follows.

Figure 8:
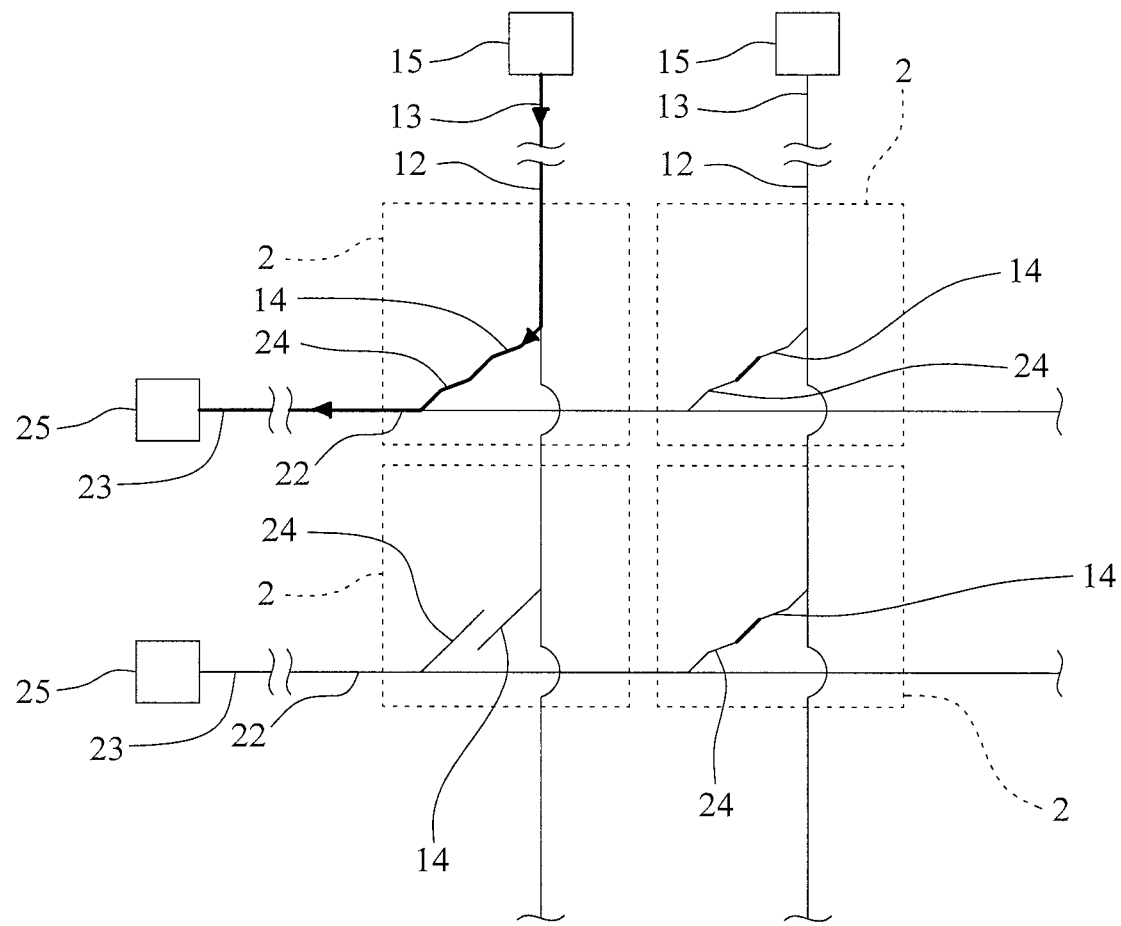
FIG. 8 illustrates a schematic diagram of line conducting of the optical membrane switch device according to another embodiment of the instant disclosure.

As shown in FIG. 8, in the embodiment, while three keys 2 are simultaneously pressed (e.g., the keys 2 in upper left corner, upper right corner, and lower right corner in the figure are pressed), firstly, the light source 15 on the far left in the figure emits light rays to have the corresponding light rays transmitted from the light input end 13 to the light input line 12 and guided to each of the first branch lines 14. Next, the light rays in the first branch lines 14 are transmitted to the second branch lines 24 and are transmitted to the light sensing end 23 via the light output line 22. The corresponding light sensor 25 in upper left corner receives the light rays and correspondingly outputs the light sensing signal. Accordingly, it is determined that the upper left key 2 is pressed. In addition, based upon the characteristic that light travels in a straight line, the light rays are not transmitted towards a direction away from the light sensing end 23 after the light rays in the first branch line 14 are transmitted to the second branch line 24. A reverse feedback of light rays transmitted from the keys 2 in the upper right corner and the lower right corner to the light sensor 25 in the lower left corner which leads to a false determination that the lower left key 2 is pressed can be avoided. The issue of ghost key can be accordingly avoided.

Figure 9:
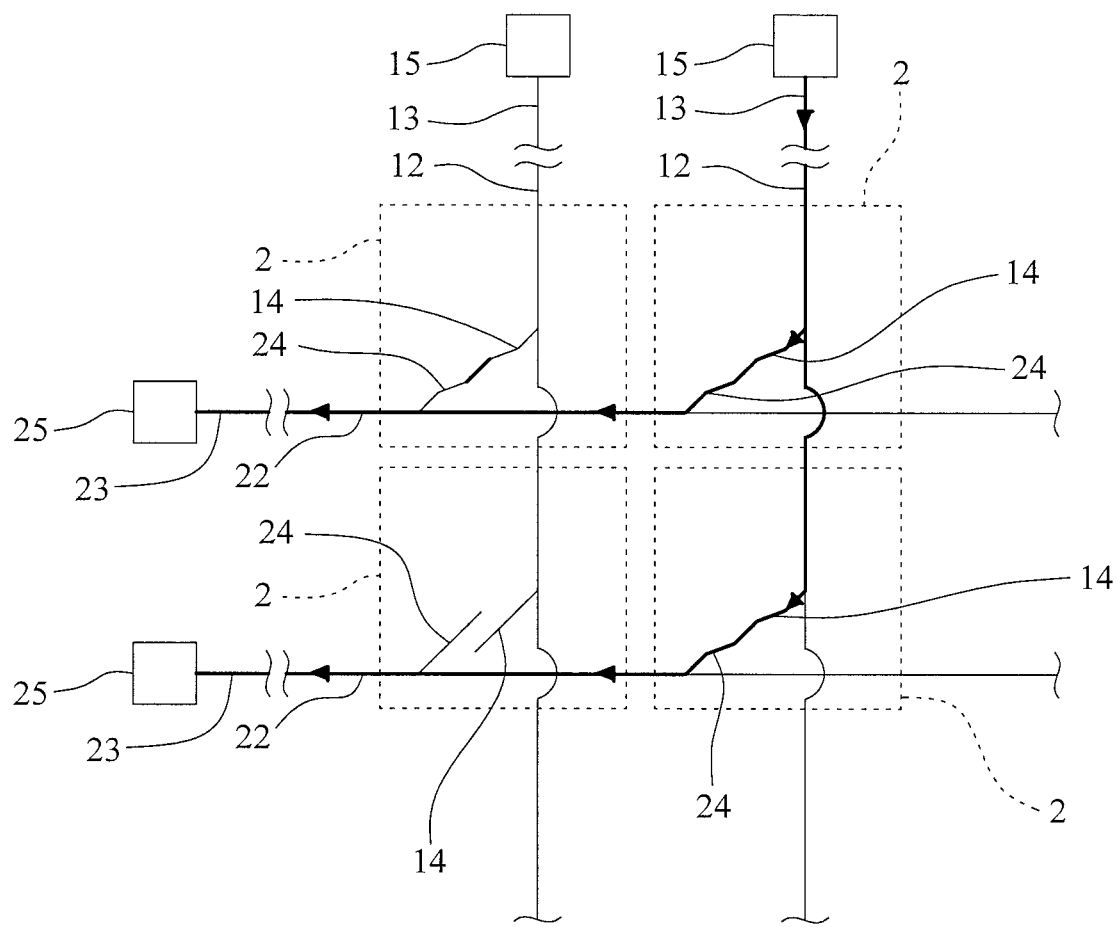
FIG. 9 illustrates a schematic diagram of line conducting of the optical membrane switch device according to yet another embodiment of the instant disclosure.

Next, as shown in FIG. 9, the light source 15 on the right side in the figure instead emits light rays to have the corresponding light rays transmitted from the light input end 13 to the light input line 12 and guided to the two first branch lines 14 corresponding to the keys 2 in the upper right corner and the lower right corner. The light rays in the two first branch lines 14 are similarly transmitted to the second branch lines 24 and are transmitted to the two light sensing ends 23 via the light output lines 22. In the meantime, the corresponding two of the upper and lower light sensors 25 receive the light rays and correspondingly output the light sensing signals. Accordingly, it is determined that the upper right and lower right keys 2 are pressed. Whereby signals from the keys 2 not pressed will not be detected by the optical membrane switch device 1 of the embodiments. The generation of false signals can be avoided to reach the function of preventing ghost key.

In some embodiments, the above light sources 15 may respectively emit light rays in the same optical characteristic or in different optical characteristics (e.g., wavelength, frequency, or color). For example, each of the light sources 15 may emit light rays in different optical characteristics, such that each of the light sensors 25 may output different light sensing signals according to the light rays in different optical characteristics to facilitate the determination of which of the keys 2 being pressed.

Figure 10:
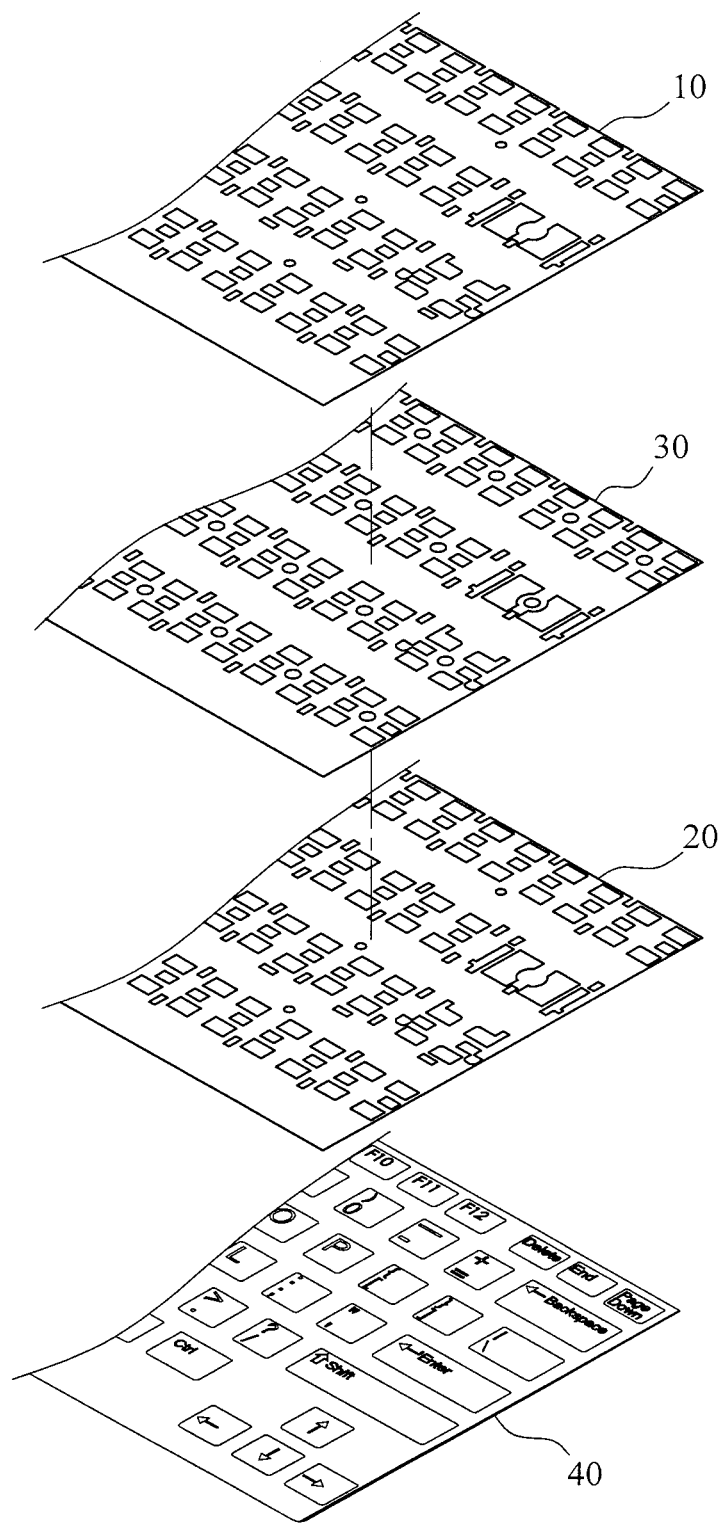
FIG. 10 illustrates an exploded view of an optical membrane switch device according to another embodiment of the instant disclosure.

As shown in FIG. 10, in an embodiment, the optical membrane switch device 1 may comprise a keyboard legend layer 40. In the embodiment, the keyboard legend layer 40 is a thin film on which letters, numbers, or characters are printed. The keyboard legend layer 40 is superimposed on the first membrane layer 10 or the second membrane layer 20 (it is superimposed beneath the second membrane layer 20 in the embodiment). The first membrane layer 10, the second membrane layer 20, and the spacer layer 30 are made by transparent materials. While the keyboard legend layer 40 receives light, the letters, numbers, or characters on the keyboard legend layer 40 can be displayed on each of the transparent keys 2 for users to operate. While a user need to use a keyboard with different languages or functions, the original keyboard legend layer 40 can be replaced by another keyboard legend layer 40 corresponding to the different languages or functions. There is no need to replace the whole keyboard. It is more convenient for use, and the cost can be reduced.

Figure 11:
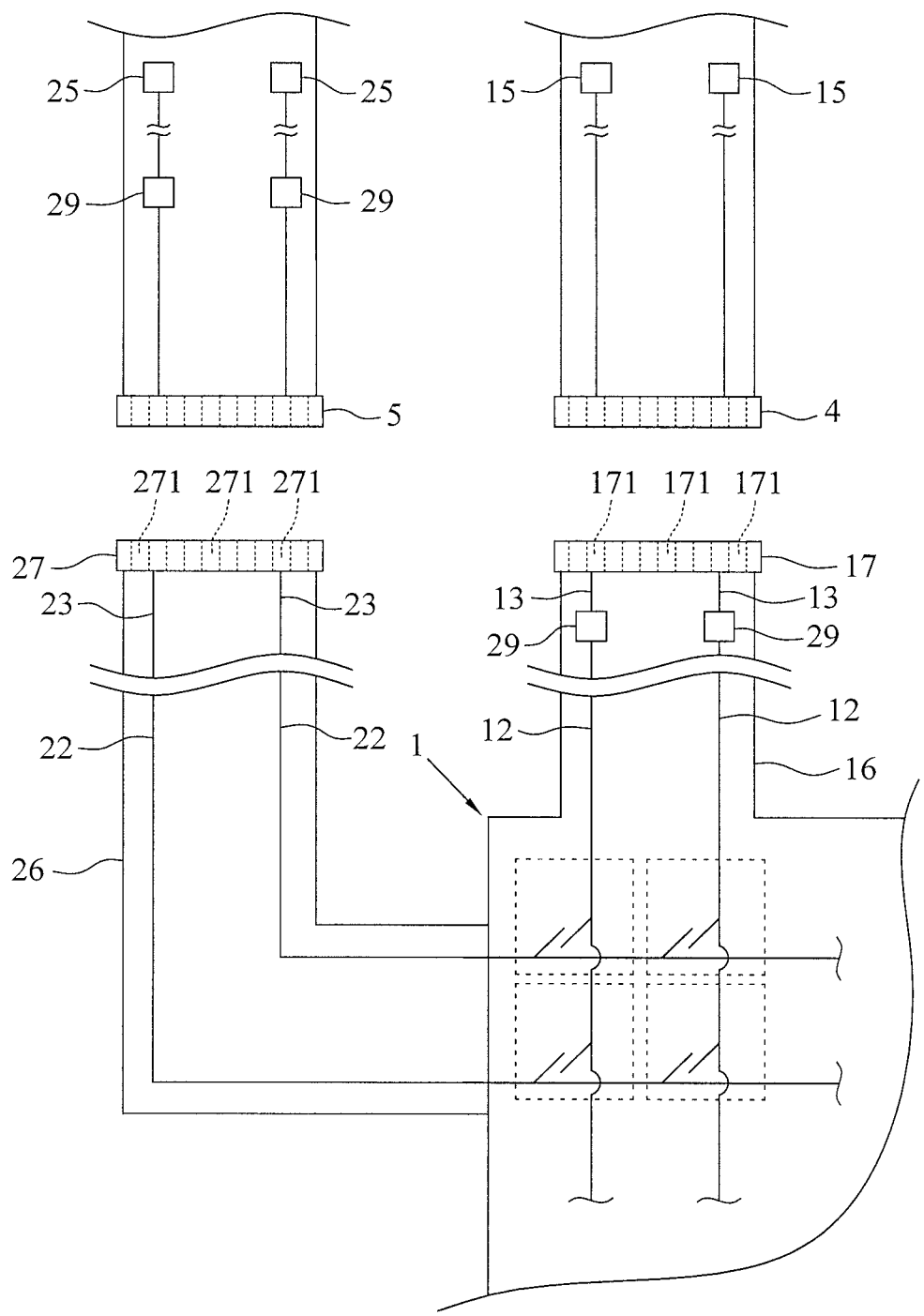
FIG. 11 illustrates a plane view of an optical membrane switch device according to another embodiment of the instant disclosure.

Please refer to FIG. 1 and FIG. 11. In an embodiment, the first membrane layer 10 may comprise a first output end 16. The first output end 16 may integrally extend from a side of the first membrane layer 10. For example, the body of the first membrane layer 10 and the first output end 16 may be formed in one piece in a mechanical processing manner (e.g., stamping or cutting). The first output end 16 is provided with a first light guide connector 17. The first light guide connector 17 comprises a plurality of first light guide holes 171. The light input ends 13 of the light input lines 12 extend to the first output end 16 and correspond to the first light guide holes 171 of the first light guide connector 17. The second membrane layer 20 comprises a second output end 26. The second output end 26 may integrally extend from a side of the second membrane layer 20. For example, the body of the second membrane layer 20 and the second output end 26 may be formed in one piece in a mechanical processing manner (e.g., stamping or cutting). The second output end 26 is provided with a second light guide connector 27. The second light guide connector 27 comprises a plurality of second light guide holes 271. The light sensing ends 23 of the light output lines 22 extend to the second output end 26 and correspond to the second light guide holes 271 of the second light guide connector 27.

Whereby, as shown in FIG. 11, the optical membrane switch device 1 may be respectively connected to light guide connectors 4 and 5 of an external electronic component (e.g., a tablet computer) via the first light guide connector 17 and the second light guide connector 27. The light source 15 and the light sensor 25 may be disposed in the external electronic component to emit light rays to the optical membrane switch device 1 via the light guide connector 4 and the first light guide connector 17 and to receive light rays generated after the key 2 being pressed via the light guide connector 5 and the second light guide connector 27, so as to have light rays transmitted to the external electronic component and transformed into electric signals in need. Since the optical membrane switch device 1 and the external electronic component are connected via a light guide hole in an optoelectronic, non-contact manner (the above first light guide connector 17 and the light guide connector 4; the above second light guide connector 27 and the light guide connector 5), either the external electronic component or the optical membrane switch device 1 is benefit to the design of water-proof. In addition, the keyboard applied with the optical membrane switch device 1 has no need of the light source 15 and light sensor 25; therefore, it can reach a complete water-proof effect.

Please refer to FIG. 11. In some embodiments, in order to decrease the numbers of the first light guide hole 171 and the second light guide hole 271, the first light guide hole 171 and the second light guide hole 271 may be designed to allow light rays having two or more wavelengths to pass through. Moreover, there are filters 29 respectively disposed on the light input end 13 of the light input line 12 of the first membrane layer 10 and on a position close to the light sensor 25 of the external electronic component. Whereby light rays having different frequencies can share a same light guide hole by the filters 29, so as to decrease the numbers of the first light guide hole 171 and the second light guide hole 271.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. An optical membrane switch device, comprising:
    a first membrane layer comprising a first surface and a plurality of light input lines, the light input lines being disposed on the first surface, each of the light input lines comprising a light input end, each of the light input lines being slantingly extended with a plurality of first branch lines;
    a second membrane layer comprising a second surface and a plurality of light output lines, the light output lines being disposed on the second surface, the second surface and the first surface being opposite to each other, each of the light output lines comprising a light sensing end, each of the light output lines being slantingly extended with a plurality of second branch lines, the second branch lines respectively extending to the corresponding first branch lines to form a plurality of contact regions; and
    a spacer layer clamped between the first surface of the first membrane layer and the second surface of the second membrane layer, the spacer layer comprising a plurality of through holes respectively corresponding to the contact regions, each of the first branch lines and each of the second branch lines corresponding to each of the through holes at least partially overlapping each other and keeping a preset interval from each other;
    wherein each of the contact regions is optionally pressed to have each of the corresponding first branch lines contact each of the corresponding second branch lines via each of the corresponding through holes to guide light, such that light rays inputted from each of the light input ends are capable of being transmitted to each of the light sensing ends via each of the light input lines, each of the first branch lines, each of the second branch lines, and each of the light output lines.

2. The optical membrane switch device of claim 1, wherein each of the light sensing ends is further connected with a light sensor for correspondingly outputting a light sensing signal.

3. The optical membrane switch device of claim 2, wherein the light sensing signal has a signal strength value, and the signal strength value is in direct ratio to a contacting area of each of the corresponding first branch lines and each of the corresponding second branch lines.

4. The optical membrane switch device of claim 2, further comprising a plurality of light filters, wherein each of the light filters is respectively disposed on each of the light input ends and is close to each of the light sensors.

5. The optical membrane switch device of claim 1, wherein each of the light input lines is slantingly extended with the first branch lines on the same side, and each of the light output lines is slantingly extended with the second branch lines on the same side.

6. The optical membrane switch device of claim 1, wherein the light input lines and the light output lines are interlaced with each other in perpendicular configuration, each of the light input lines is slantingly extended with the first branch lines along a direction away from each of the light input ends and close to each of the light sensing ends, and each of the light output lines is slantingly extended with the second branch lines along a direction away from each of the light sensing ends and close to each of the light input ends.

7. The optical membrane switch device of claim 1, wherein each of the light input ends is further connected with a light source, and the light sources emit light rays sequentially.

8. The optical membrane switch device of claim 1, wherein each of the light input ends is further connected with a light source, the light sources respectively emit light rays having different optical characteristics.

9. The optical membrane switch device of claim 1, wherein a refractive index of each of the second branch lines is greater than or equal to a refractive index of each of the first branch lines.

10. The optical membrane switch device of claim 1, wherein a refractive index of each of the light input lines is greater than a refractive index of the first membrane layer and a refractive index of the spacer layer, and a refractive index of each of the light output lines is greater than a refractive index of the second membrane layer and a refractive index of the spacer layer.

11. The optical membrane switch device of claim 1, further comprising a keyboard legend layer, wherein the keyboard legend layer is superimposed on the first membrane layer or the second membrane layer, and the first membrane layer, the second membrane layer, and the spacer layer are made by transparent materials.

12. The optical membrane switch device of claim 1, wherein the first membrane layer comprises a first output end, the first output end is provided with a first light guide connector, the first light guide connector comprises a plurality of first light guide holes, and the light input ends of the light input lines extend to the first output end and correspond to the first light guide holes of the first light guide connector; wherein the second membrane layer comprises a second output end, the second output end is provided with a second light guide connector, the second light guide connector comprises a plurality of second light guide holes, and the light sensing ends of the light output lines extend to the second output end and correspond to the second light guide holes of the second light guide connector.

* * * * *